United States Patent [19]

Yoldas

[11] 4,271,210
[45] Jun. 2, 1981

[54] METHOD OF FORMING TRANSMISSIVE, POROUS METAL OXIDE OPTICAL LAYER OF A VITREOUS SUBSTRATE

[75] Inventor: Bulent E. Yoldas, Pittsburgh, Pa.

[73] Assignee: Westinghouse Electric Corp., Pittsburgh, Pa.

[21] Appl. No.: 116,329

[22] Filed: Jan. 28, 1980

Related U.S. Application Data

[63] Continuation-in-part of Ser. No. 88,280, Oct. 25, 1979, abandoned.

[51] Int. Cl.$^3$ .......................... B05D 1/18; B05D 3/02
[52] U.S. Cl. ..................................... 427/169; 427/64; 427/160
[58] Field of Search .......................... 427/169, 64, 160

[56] References Cited

U.S. PATENT DOCUMENTS

| | | | |
|---|---|---|---|
| 3,941,719 | 3/1976 | Yoldas | 252/463 |
| 4,132,919 | 1/1979 | Maple | 427/66 X |
| 4,161,560 | 7/1979 | Kienel | 427/164 X |

OTHER PUBLICATIONS

Yoldas, "Hydrolysis of Aluminum Alkoxides and Bayerite Conversion" J. Appl. Chem. Biotechnol, 1973, 23, pp. 803–809.
Yoldas, "Preparation of Glasses and Ceramics from Metal-Organic Compounds" J. Mat. Sci. 12 (1977), pp. 1203–1208.
Yoldas, "Monolithic Glass Formation by Chemical Polymerization" J. Mat. Sci. 14 (1979) pp. 1843–1849.
Yoldas, "A Transparent Porous Alumina" Ceramic Bulletin, vol. 54, No. 3, pp. 286–288, (1975).
Yoldas, "Alumina Sol Preparation from Alkoxides" Ceramic Bulletin, vol. 54, No. 3, pp. 289–290, (1975).

Primary Examiner—James R. Hoffman
Attorney, Agent, or Firm—W. G. Sutcliff

[57] ABSTRACT

A method of forming an optically clear, thin metal oxide, porous layer on a vitreous glass substrate, with this metal oxide layer having a low index of refraction. A clear colloidal solution is prepared using metal alkoxide and the substrate is dipped in this solution. The concentration of metal oxide equivalent in the solution, and the rate of withdrawal of the glass substrate from the solution are controlled to form the porous metal oxide layer on the substrate with the layer being about a quarter-wavelength optically thick. This low index of refraction metal oxide layer forms an effective antireflective layer on a vitreous substrate of higher index of refraction, and minimize reflection from the substrate-metal oxide layer interface.

3 Claims, 2 Drawing Figures

METHOD OF FORMING TRANSMISSIVE, POROUS METAL OXIDE OPTICAL LAYER OF A VITREOUS SUBSTRATE

CROSS REFERENCE TO RELATED APPLICATION

This is a continuation-in-part of application Ser. No. 088,280, filed Oct. 25, 1979, now abandoned.

BACKGROUND OF THE INVENTION

The present invention relates to forming a light transmissive, porous metal oxide optical layer having a low index of refraction upon a vitreous substrate. More particularly the invention relates to providing an antireflective coating or layer on a light transmissive substrate, such as a cathode ray tube glass faceplate, or a glass solar collector. When light passes through the interface between two mediums of differing index of refraction, such as the interface between a cathode ray tube faceplate and air on the viewing side, there is a reflection of some portion of the light. This reflected light is effectively not transmitted and is a transmission loss. For soda-lime glass faceplates, this transmission loss can be of the order of 4-8% which reduces the efficiency of the device.

If this reflection can be eliminated or minimized, a corresponding increase in the efficiency of light transmission can be effected for the device. For a cathode ray tube, this means more of the phosphor-generated light will be available to the viewer, i.e., a higher screen brightness.

It is known that coating a transmissive substrate with a light transmissive film is one way of eliminating reflectance.

For a coated surface, the minimum reflection is given by $$R_m = \left( \frac{n_c^2 - n_1 n_2}{n_c^2 + n_1 n_2} \right)^2$$

$n_c$ = index of coating
$n_1$ = index of medium
$n_2$ = index of substrate

From the above equation it follows that, in an air or vacuum medium ($n_1 \simeq 1$) in order for the reflectivity to be zero ($R_m = 0$), the relation between the indices of the substrate and coating must be:

$$n_c = \sqrt{n_2}$$

and the thickness of the film, t, must also meet the quarter-wave optical thickness requirement $$t = \frac{\lambda_m}{4 n_c}$$

where $\lambda_m$ = wavelength of minimum reflectivity

This means that an antireflective film on glass having an index of refraction of 1.52, must have an index of around 1.23 from the above. This low index requirement makes it practically impossible to design a single layer inorganic antireflective film on glass, since the lowest index inorganic material $MgF_2$ has an index of 1.38 which reduces the minimum reflection to about 1.2% and has been widely used in the industry.

However, the problem can be attacked in another direction. Since the index of refraction of a material is related to its density, which can be lowered by introducing porosity, the index can also be lowered. It is required, however, that the pore size must be substantially smaller than the wavelength of the light and the pore distribution must be homogeneous in order not to affect the light transmission and cause scattering.

The density and index of refraction in these materials are related by:

$$\frac{(n')^2 - 1}{n^2 - 1} = \frac{d'}{d}$$

where n and d are the index and density of the non-porous or coating material, and n' and d' are index and density of the porous material. The above equation can be written in terms of porosity as $$(n')^2 = (n^2 - 1)(1 - \frac{P}{100}) + 1$$

where P = percent porosity.

In order to make a film with an index of 1.23, for example if the dense material is glass with an index of 1.52, a porosity of approximately 59% is needed. FIG. 1 shows how the index of refraction of $TiO_2$, $Al_2O_3$ and $SiO_2$ varies with porosity. Transparent, porous metal oxide has been produced from clear solutions derived from metal alkoxides. Preparation of colloidal and polymerized solutions which produced continuous transparent oxide films and bodies at low temperature have been presented by the inventor in "Alumina Sol Preparation From Alkoxides" from *The American Ceramic Society Bulletin*, Vol. 54, No. 3, pp. 289-290, and "Monolithic Glass Formation by Chemical Polymerization", Journal of Material Science Vol. 14 pp. 1843-1849 (1979).

SUMMARY OF THE INVENTION

A method of forming a transparent, porous, low index of refraction metal oxide layer on a vitreous substrate is detailed. A clear sol containing a preferred concentration of metal oxide is prepared, and the substrate is placed in the sol and withdrawn at a rate which leaves a polymerized metal hydroxide layer on the glass substrate, which film is approximately a quarter-wave optically thick. The thin porous layer on the substrate is then heated to convert the layer to metal oxide at a temperature of 300°-500° C. The metal oxide is selected from one of aluminum oxide, silicon dioxide, and titanium dioxide.

DESCRIPTION OF THE PREFERRED EMBODIMENTS

Figure 1:
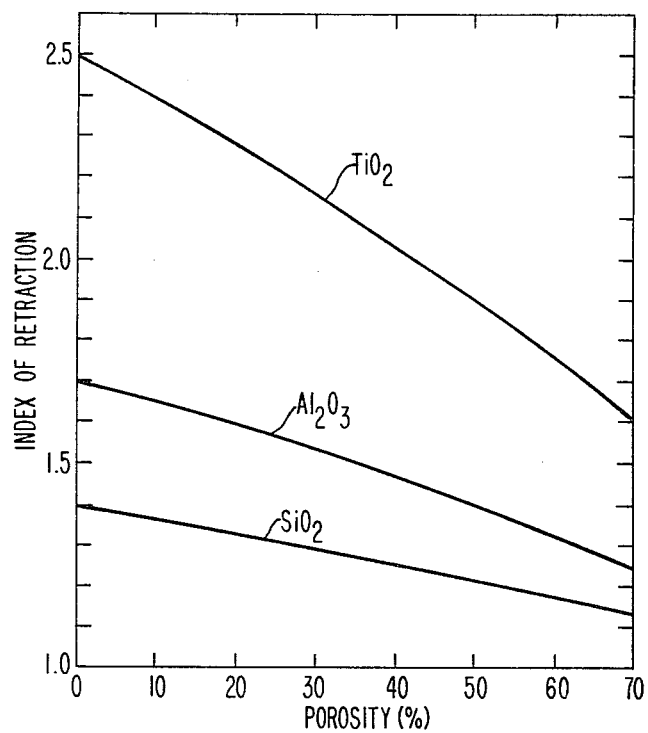
FIG. 1 is plot of the index of refraction as a function of porosity for aluminum oxide, silicon dioxide, and titanium dioxides.
Figure 2:
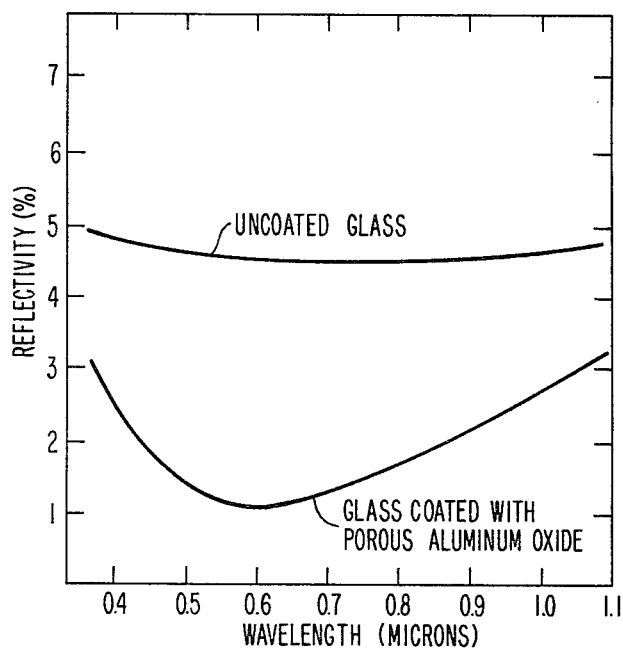
FIG. 2 is a plot of the reflectivity in percent as a function of wavelength in microns for a glass substrate alone, and for one with a low index of refraction porous metal oxide layer thereon.

A clear solution sol is prepared by hydrolyzing an aluminum alkoxide, $Al(OR)_3$, such as aluminum secondary butoxide, $Al(OC_4H_9)_3$. For example, one mole of the aluminum secondary butoxide is vigorously stirred into about 2000 ml of double-distilled, deionized water at a temperature of 70° C. The temperature is raised to about 80° C., and 3.6 grams of acetic acid is introduced after the slurry is stirred for 10–15 minutes to complete hydrolysis of the aluminum alkoxide.

The resultant mixture is kept at 80°–100° C. until it is peptized to a clear solution. The clear solution is cooled.

The vitreous glass tube faceplate or other such glass substrate which is to be coated is then dipped into this solution and withdrawn at a rate of about 7 centimeters per minute. A gel like coating remains on the glass substrate. This gel coated glass substrate is then pyrolyzed or heated at from 300°–500° C. to form a porous aluminum oxide layer which is about 1100–1200 Angstroms thick on the glass substrate, with the pore size between oxide particle of less than about 100 Angstroms, and with the porosity of the layer being above 40 percent and up to 64 percent. This porous aluminum oxide layer has an index of refraction of about 1.32 and has been as low as 1.318. The pore size for the aluminum oxide should be less than about 100 Angstroms to prevent scattering of light.

This low index of refraction porous aluminum oxide layer may be deposited on one or both sides of the glass substrate, with a suitable masking layer provided on the substrate surface which is not to be coating.

The metal alkoxide derived aqueous solution has a concentration of equivalent oxide which is about 1 to 3 percent based on the weight equivalent of aluminum oxide. A variety of aluminum alkoxides can be used and aluminum isopropoxide in an example.

The acid used for peptizing the solution can be varied, with the concentration such that about 0.1 mole of acid is used per mole of alkoxide, with at least 0.03 mole of acid per mole of alkoxide being necessary. While acetic acid has been found particularly effective other noncomplexing acids such as nitric, hydrochloric, and perchloric have been utilized.

It has been discovered that the thickness of the gel coating and resultant porous aluminum oxide coating is primarily determined by the concentration of aluminum alkoxide in solution, and by the rate at which the glass substrate is pulled from the solution. The quarter-wavelength desired thickness for 6000 Angstrom light at the refractive index of about 1.32 is about 1100–1200 Angstroms, but uniform coatings of from 1000–1400 Angstroms result in significantly reduced reflectivity.

At low alkoxide concentrations an alky phenoxypolyethoxy ethanol based colloidal nonionic surfactant, Triton X-102, a trademarked material of Rohm & Haas Corporation was added in amounts of 30–50 mg per liter of solution to prevent beading of alumina particles on the glass.

In general the lowest index of refraction coatings are obtained when glycol or other liquid alaphatic alcohol has been substituted for the aqueous medium in the original hydrolyzing step.

While aluminum oxide was used in the above example, it should be understood that porous layers of silicon dioxide and titanium dioxide can likewise be formed from solution.

What I claim is:

1. Method of forming a substantially transparent, porous thin layer of aluminum oxide on a vitreous substrate, which aluminum oxide layer has an index of refraction substantially less than that of the vitreous substrate, which method comprises:
   (a) preparing a clear solution from aluminum alkoxide, which solution is peptized or polymerized with the aluminum maintained in a clear soluble form in a concentration of about 1 to 3% based on the equivalent weight of aluminum oxide;
   (b) dipping the vitreous substrate in the clear solution and withdrawing the substrate therefrom at a rate of about seven centimeters per minute to deposit a layer of the clear solution on the vitreous substrate;
   (c) pyrolyzing the layer on the substrate by heating to a temperature of from 300°–500° C. to form the porous aluminum oxide layer of low index of refraction, a porosity of greater than 40%, and pore size of less than about 100 angstroms, and a layer thickness of approximately an optical quarter wave.

2. The method set forth in claim 1, wherein a nonionic surfactant colloidal alky phenoxypolyethoxy ethanol surfactant is added to the solution.

3. The method set forth in claim 1, wherein glycol or liquid aliphatic alcohol is included in the solution as a suspension medium.

* * * * *